US011959620B2

(12) United States Patent
Morales et al.

(10) Patent No.: US 11,959,620 B2
(45) **Date of Patent: *Apr. 16, 2024**

(54) LIGHT FIXTURE WITH REMOVABLE DRIVER ENCLOSURE

(71) Applicant: Progress Lighting, LLC, Greenville, SC (US)

(72) Inventors: Luis Morales, Fountain Inn, SC (US); Anthony Sinphay, Greenville, SC (US)

(73) Assignee: Progress Lighting, LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,851

(22) Filed: Apr. 3, 2023

(65) Prior Publication Data

US 2023/0243492 A1 Aug. 3, 2023

Related U.S. Application Data

(63) Continuation of application No. 16/035,233, filed on Jul. 13, 2018, now Pat. No. 11,635,195.

(60) Provisional application No. 62/532,033, filed on Jul. 13, 2017.

(51) Int. Cl.
*F21V 23/00* (2015.01)
*F21S 8/02* (2006.01)
*H05B 45/00* (2022.01)

(52) U.S. Cl.
CPC ........... *F21V 23/008* (2013.01); *H05B 45/00* (2020.01); *F21S 8/026* (2013.01)

(58) Field of Classification Search
CPC ............ F21S 8/026; F21S 8/02; F21V 23/026
See application file for complete search history.

(56) References Cited

U.S. PATENT DOCUMENTS

| | | | | |
|---|---|---|---|---|
| 5,957,574 | A * | 9/1999 | Hentz | F21V 21/04 248/302 |
| 6,343,873 | B1 * | 2/2002 | Eberhard | F21V 19/00 362/147 |
| 9,429,307 | B1 | 8/2016 | Kathawate et al. | |
| 9,627,830 | B1 | 4/2017 | Wronski et al. | |
| 2009/0080189 | A1 | 3/2009 | Wegner | |

(Continued)

FOREIGN PATENT DOCUMENTS

| | | |
|---|---|---|
| CN | 101836042 A | 9/2010 |

OTHER PUBLICATIONS

First Office Action issued by China National Intellectual Property Administration dated Sep. 14, 2021, in corresponding Chinese Patent Application No. 201880046097.6 and an English translation of the Action. (14 pages).

(Continued)

*Primary Examiner* — William J Carter
(74) *Attorney, Agent, or Firm* — Robinson + Cole LLP

(57) ABSTRACT

A light fixture includes a housing for supporting a light source and an enclosure for supporting a driver in electrical communication with the light source. The enclosure is selectively supported in one of a first position and a second position while maintaining electrical communication between the driver and the light source in both positions. The enclosure is directly coupled to the housing in the first position, and the enclosure is supported separately from the housing in the second position.

20 Claims, 8 Drawing Sheets

(56) References Cited

U.S. PATENT DOCUMENTS

| | | | | |
|---|---|---|---|---|
| 2010/0061108 | A1* | 3/2010 | Zhang | F21V 29/713 362/364 |
| 2010/0296272 | A1 | 11/2010 | Roos et al. | |
| 2015/0276141 | A1 | 10/2015 | White et al. | |

OTHER PUBLICATIONS

Lithonia Lighting, "Wafer LED Recessed Downlight WF4 4" LED Module", Features & Specifications, copyright 2016-2017 Acuity Brands Lighting, Inc. (3 pages).
Satco S9062 Features, copyright 2012 Staco Products, Inc. (2 pages).
International Search Report and Written Opinion dated Sep. 13, 2018, by the International Searching Authority in corresponding International Patent Application No. PCT/US2018/042110. (16 pages).

* cited by examiner

LIGHT FIXTURE WITH REMOVABLE DRIVER ENCLOSURE

CROSS-REFERENCE TO RELATED APPLICATIONS

This application is a continuation of U.S. patent application Ser. No. 16/035,233, filed Jul. 13, 2018, which claims the benefit of U.S. Provisional Patent Application No. 62/532,033, filed Jul. 13, 2017, the entire contents of which are incorporated by reference.

BACKGROUND

The present disclosure relates to light fixtures, and particularly to a light fixture including a driver for controlling current to a light emitting element.

SUMMARY

In one independent aspect, a light fixture includes a housing for supporting a light emitter and an enclosure supporting a driver in electrical communication with the light emitter. The enclosure is capable of being selectively supported in each of a first position and a second position while maintaining electrical communication between the driver and the light emitter in both the first position and the second position. The enclosure is directly coupled to the housing in the first position, and the enclosure is supported separately from the housing in the second position.

In another independent aspect, a light fixture includes a housing and an enclosure. The housing includes a first side and a second side opposite the first side. The housing is coupled to a support structure and supports a light emitter. The enclosure supports a driver in electrical communication with the light emitter. The enclosure is capable of being selectively supported in each of a first position and a second position while maintaining electrical communication between the driver and the light emitter in each position. The enclosure is directly coupled to the housing in the first position, and the enclosure is directly coupled to a support structure separately from the housing in the second position.

In yet another independent aspect, a method for installing a light fixture includes: determining whether the light fixture may be mounted in a desired location while an enclosure supporting a control driver is directly coupled to a housing; if the enclosure cannot be directly coupled to the housing with the fixture in a desired location, mounting the housing in the desired location, and mounting the enclosure in a separate location while maintaining electrical communication between the control driver in the enclosure and a light emitter in the housing; and if the enclosure can be directly coupled to the housing with the fixture in a desired location, mounting the housing in the desired location with the enclosure directly coupled to the housing.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 3:
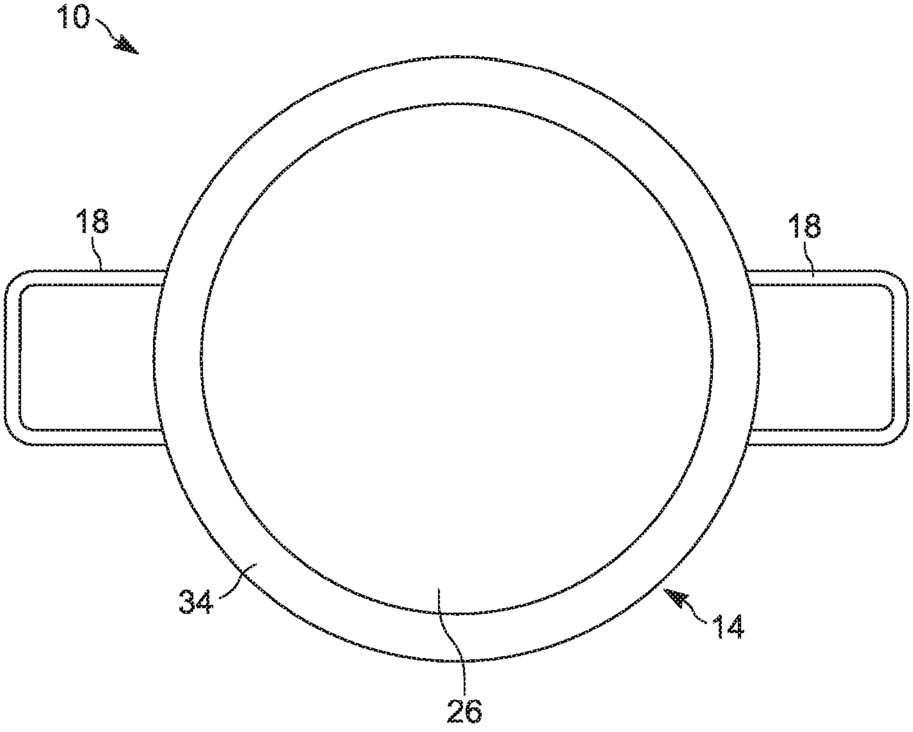
FIG. 3 is another plan view of the luminaire of FIG. 1.

FIGS. 1-5 illustrate a light fixture or luminaire 10 including a housing 14, clips or brackets 18, and an enclosure 22. As shown in FIG. 3, the housing 14 supports one or more light-emitting elements or light sources (e.g., light-emitting diodes or LEDs—not shown) and a lens or optic 26 for providing a desired light output. In the illustrated embodiment, the housing 14 is formed as a thin, disc-like structure having a first side 30 and a second side 34, and the optic 26 is formed on the second side 34. In other embodiments, the housing 14 may have a different shape. The brackets 18 are coupled to the housing 14 and extend from the housing 14 in opposite directions. The brackets 18 may be coupled to a support structure (e.g., a stud or beam—not shown) to support the luminaire 10 relative to a wall or ceiling. In the illustrated embodiment, the brackets 18 have a U-shape; in other embodiments, the brackets may have a different shape.

Figure 1:
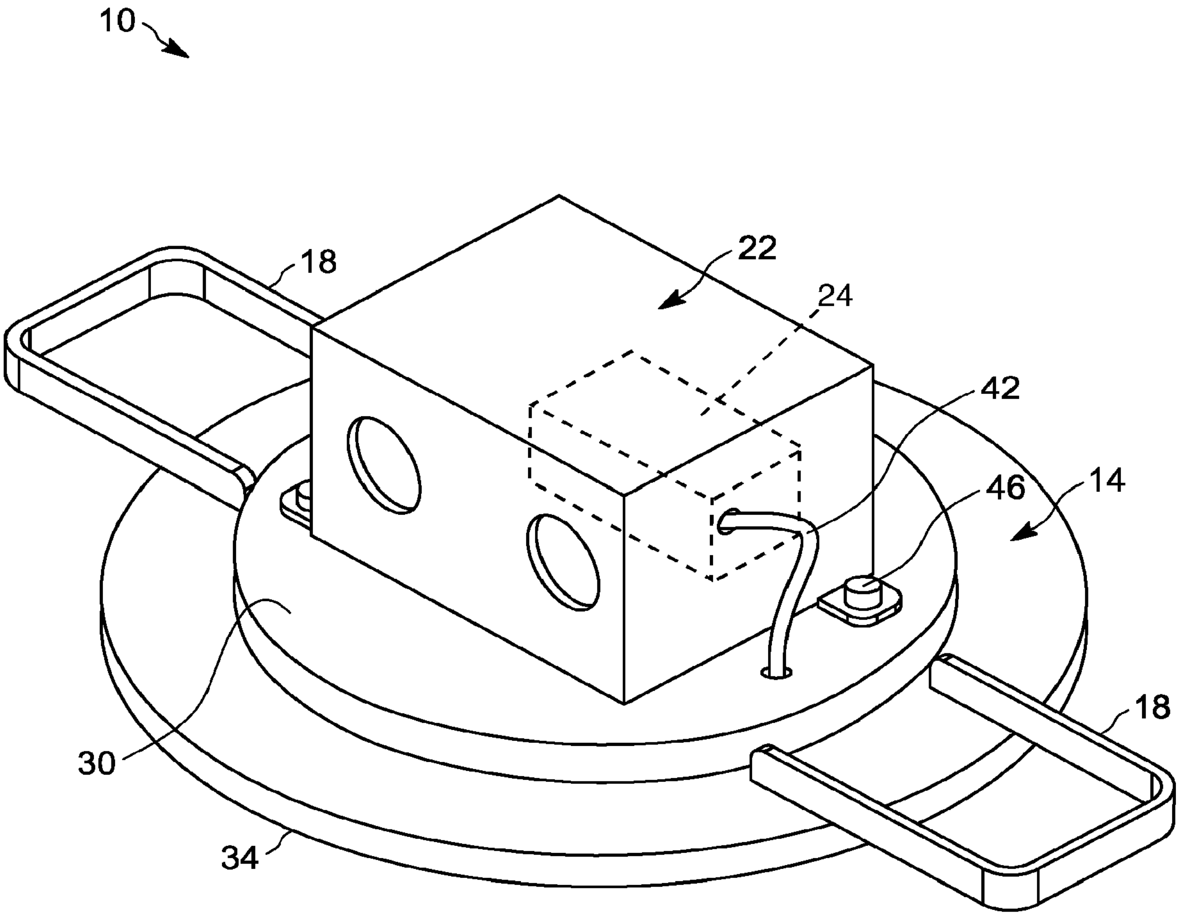
FIG. 1 is a perspective view of a luminaire.
Figure 2:
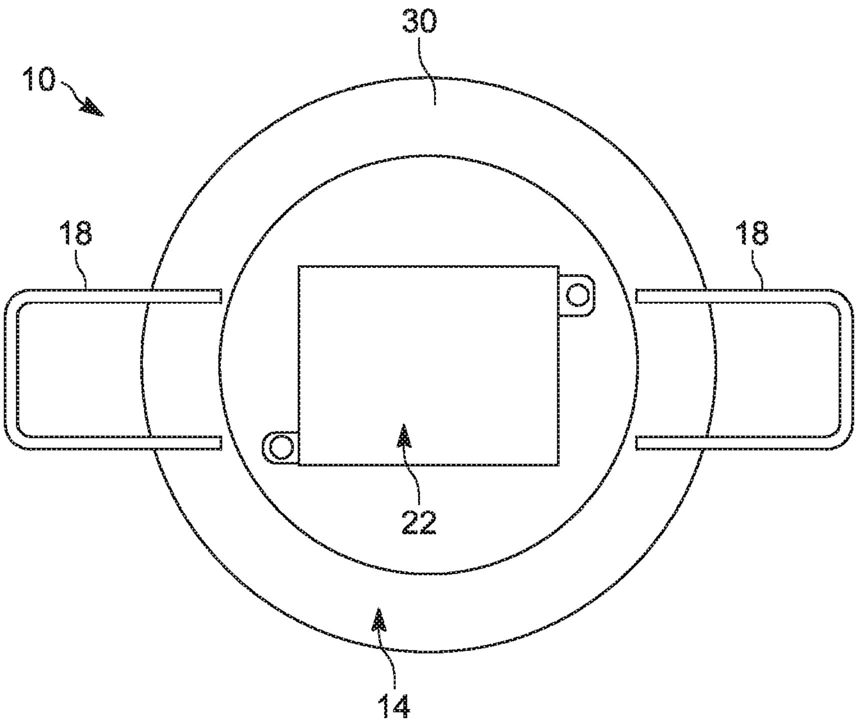
FIG. 2 is a plan view of the luminaire of FIG. 1.
Figure 4:
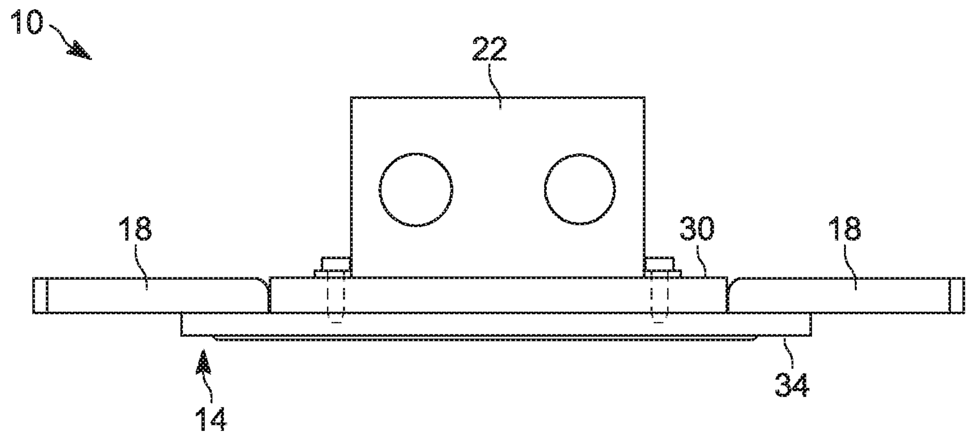
FIG. 4 is a side elevation view of the luminaire of FIG. 1.
Figure 5:
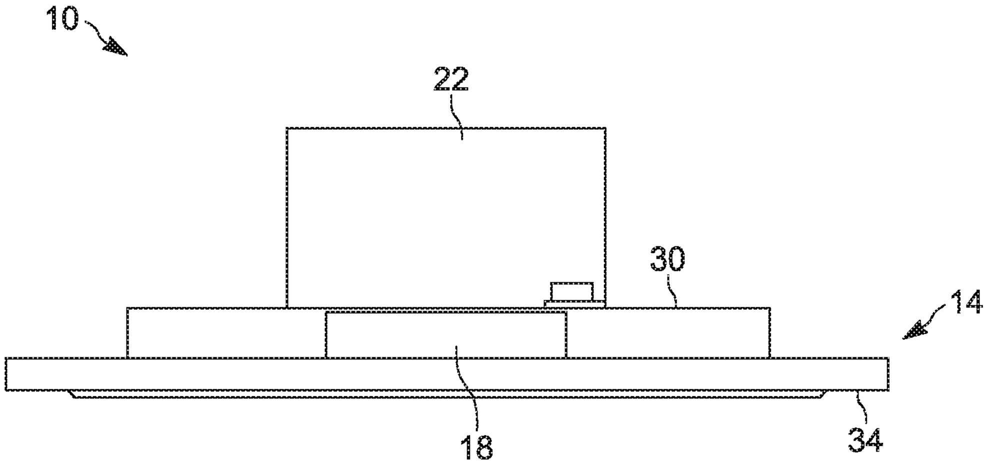
FIG. 5 is another side elevation view of the luminaire of FIG. 1.
Figure 6:
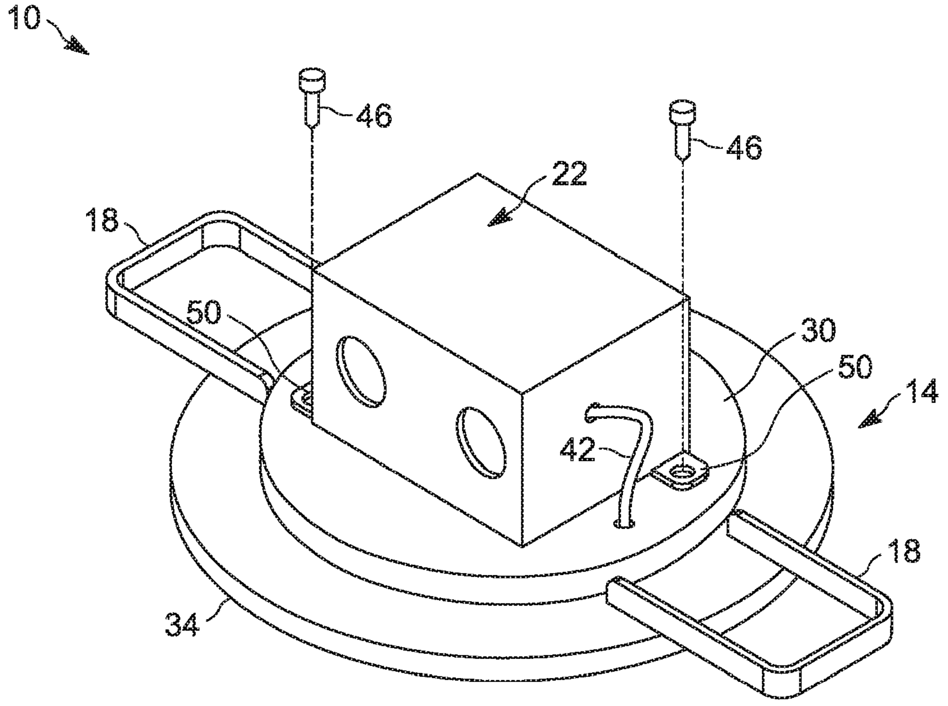
FIG. 6 is a perspective view of the luminaire of FIG. 1 with fasteners removed.
Figure 7:
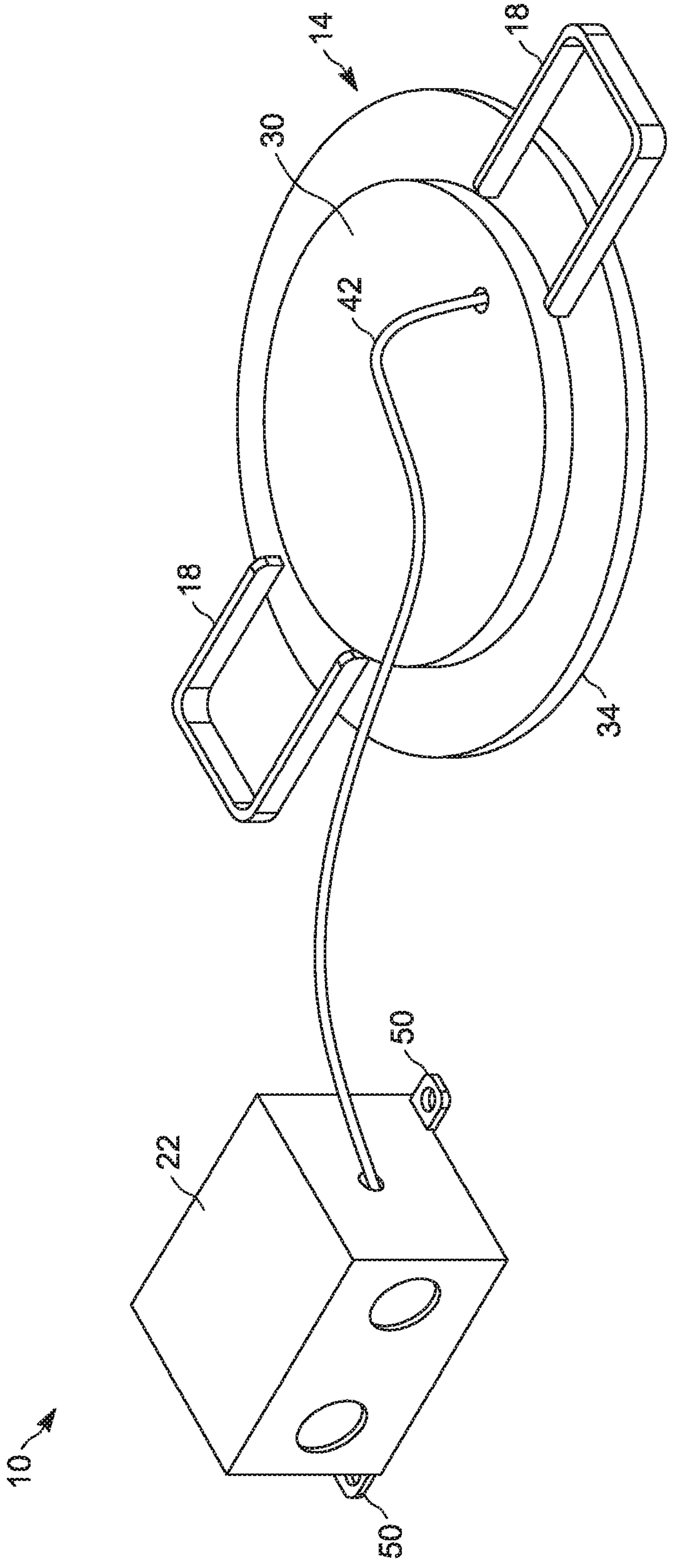
FIG. 7 is a perspective view of the luminaire of FIG. 1 with an enclosure separate from a fixture housing.

Referring to FIGS. 1, 4, and 5, the enclosure 22 houses and/supports one or more drivers 24 (FIG. 1) for driving electric current to the light sources. One or more wires or conduits 42 provide electrical communication between the drivers 24 in the enclosure 22 and the light source(s) in the housing 14. The enclosure 22 is removably coupled to the housing 14 (e.g., by fasteners 46). In the illustrated embodiment, the enclosure 22 may engage or be coupled to the first side 30 of the housing 14, opposite the optic 26. As shown in FIG. 6, the fasteners 46 may be removed from one or more mounting features 50 to uncouple the enclosure 22. Referring to FIG. 7, the enclosure 22 may therefore be separated from the housing 14 while still electrically connected to the light source via the conduit 42. As a result, the enclosure 22 may be secured to a separate portion of the support structure.

In some circumstances, the presence of studs or beams located behind a finished surface (e.g., drywall) may interfere with installing an electrical box and/or fixture in a desired position, and may limit the types of electrical boxes/fixtures that may be installed in that position. This problem may be further complicated if fixture is a recessed fixture. The enclosure 22 of the luminaire 10 can be directly coupled to the housing 14, or the enclosure 22 can be separated from the housing 14 and supported remote from the housing 14. The removable coupling provides better versatility for mounting the luminaire 10.

During installation, an operator may first try to attach or mount (e.g., on a wall or ceiling) the luminaire 10 with the enclosure 22 directly coupled to the housing 14. However, the operator may encounter a stud or support member in the desired mounting position for the luminaire 10. If so, the operator can uncouple the enclosure 22 from the housing 14 while the driver(s) in the enclosure 22 remain in electrical communication with the light source(s) in the housing 14. The operator may then mount the housing 14 in the desired position, and mount the enclosure in a different location offset from the housing 14, for example, on the support member.

In the illustrated embodiment, the mountain features 50 are coupled to the enclosure 22; in other embodiments, the enclosure 22 may be removably coupled to the housing 14 in a different manner. In another exemplary embodiment, illustrated in FIG. 8, biased retention springs 54 engage mounting features 50 to removably couple the enclosure 22 to the housing 14. In the illustrated embodiment, the springs 54 are positioned on the housing 14 and the mounting features 50 are positioned on the enclosure 22; in other embodiments, springs may be positioned on the enclosure 22 and the mounting features may be positioned on the housing 14. As shown in FIG. 9, the biased retention springs 54 may be uncoupled from the mounting features 50 (e.g., by depressing a biasing member) to uncouple the enclosure 22 from the housing 14. The enclosure 22 may be separated from housing 14 while still electrically connected to the light source via conduit 42.

In some circumstances, the presence of studs or beams located behind a finished surface (e.g. drywall) may interfere with installing an electrical box and/or fixture in a desired position, particularly with regard to maintaining electrical connection throughout the installation process. In some embodiments, the conduit 42 includes a first portion 58 operably coupled to the light source, and a second portion 62 operably connected to the enclosure 22. The first portion 58 and the second portion 62 are operably connected together by an intermediate connector 66. The intermediate connector 66 includes a first connector 70 coupled to the first portion 58 of the conduit 42, and a second connector 74 coupled to the second portion 62 of the conduit 42. The first connector 70 is engageable with the second connector 74 to enable electrical communication between the enclosure 22 and the light source, and disengageable to facilitate luminaire 10 installation.

During installation, an operator may first try to attach or mount (e.g., on a wall or ceiling) the luminaire 10 with the enclosure 22 in electrical communication with the light source. The operator may encounter a stud or support member however, that makes installing the luminaire 10 with the enclosure 22 in electrical communication with the light source difficult. In another situation, the operator may have trouble securing the enclosure 22 to a separate portion of the support structure or a different support structure while the enclosure 22 is in electrical communication with the light source. The operator can disengage the first connector 70 of the intermediate connector 66 from the first connector 74 to proceed with the installation, and the first connector 70 can be re-connected to the second connector 74 to re-enable electrical communication between the enclosure 22 and the light source when convenient to do so.

Figure 8:
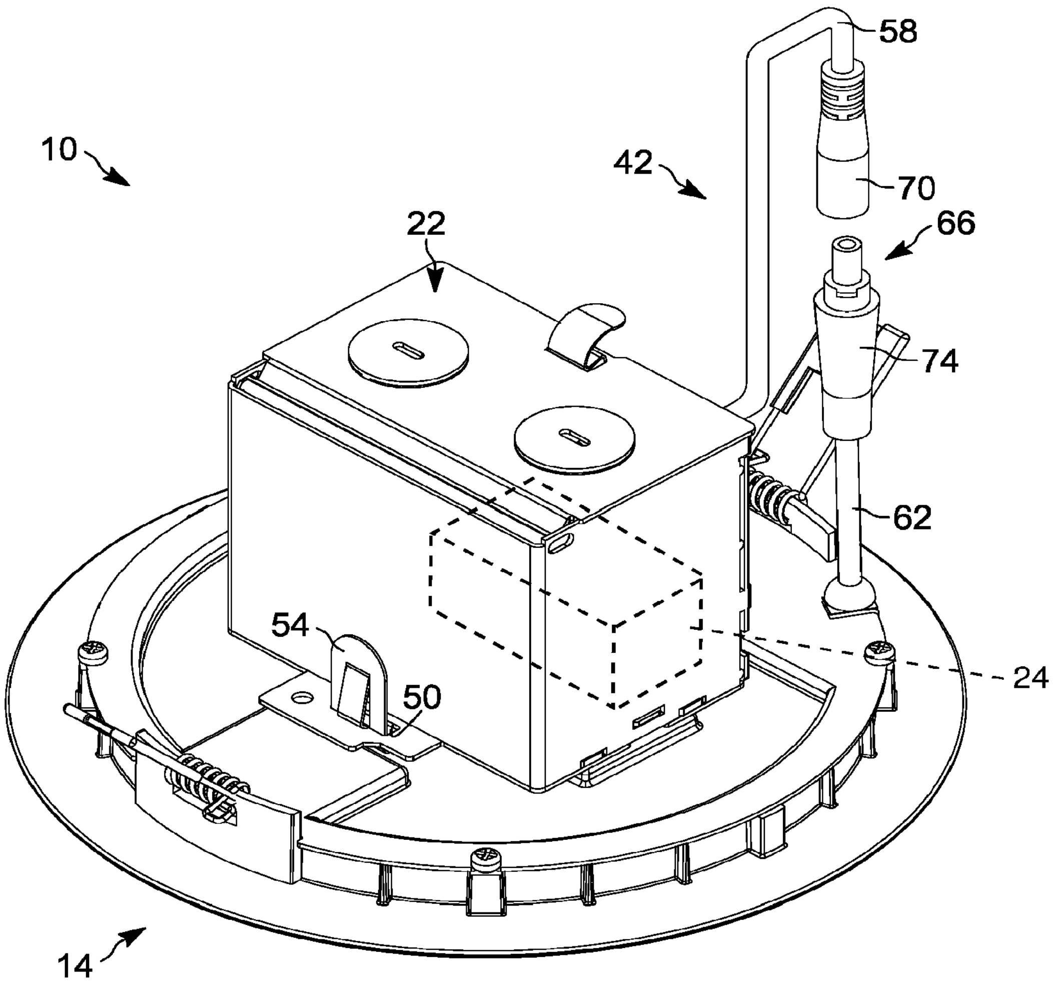
FIG. 8 is a perspective view of a luminaire according to another embodiment, with an enclosure coupled to the fixture housing.
Figure 9:
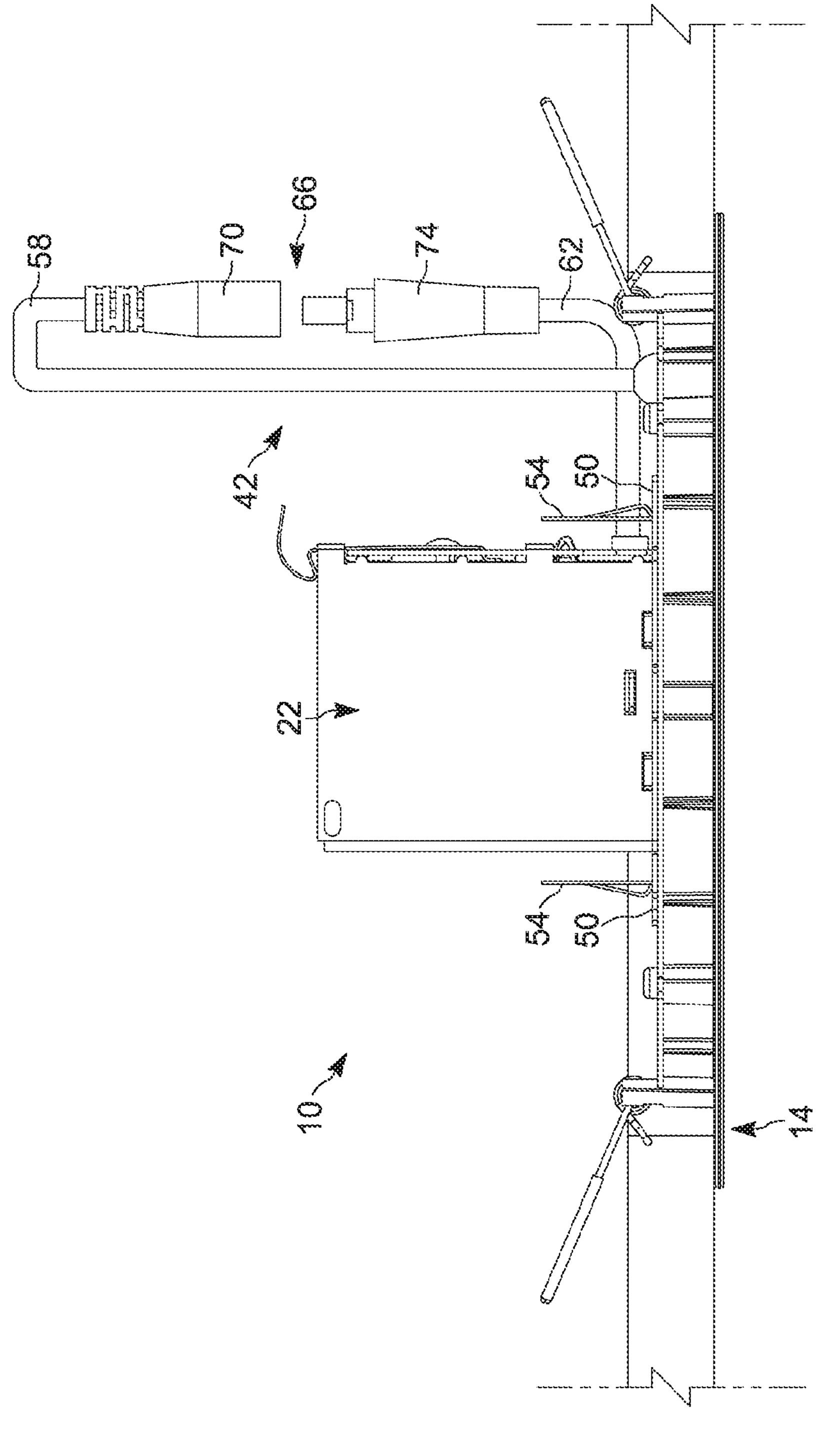
FIG. 9 is a plan view of the luminaire of FIG. 8.
Figure 10:
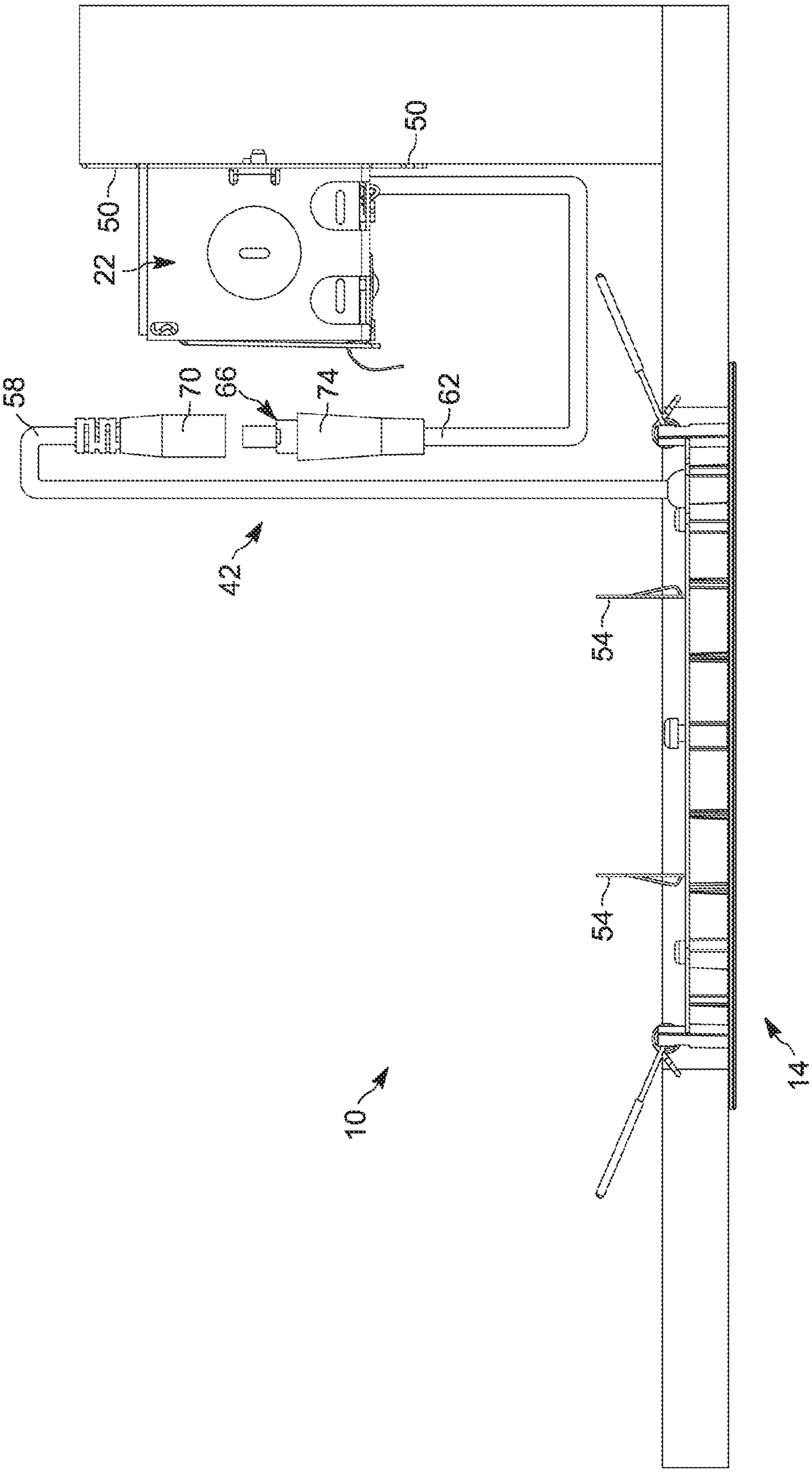
FIG. 10 is a plan view of the luminaire of FIG. 8, with the enclosure supported separate from the fixture housing.

In another situation referring to the embodiment illustrated in FIG. 8 and FIG. 9, an operator may first try to attach or mount (e.g., on a wall or ceiling) the luminaire 10 while the first connector 70 is not engaged with the second connector 74 so that the enclosure 22 is not in electrical communication with the light source. The first connector 70 can be subsequently connected to the second connector 74 to enable electrical communication between the enclosure 22 and the light source when convenient to do so.

The embodiment(s) described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. A light fixture comprising:
a housing supporting a light emitter; and
an enclosure supporting a driver in electrical communication with the light emitter, the enclosure selectively supported in each of a first position and a second position while maintaining electrical communication between the driver and the light emitter in both the first position and the second position, the enclosure being directly coupled to the housing in the first position, and the enclosure being supported separately from the housing in the second position; and
at least one mounting opening configured to facilitate directly coupling the enclosure to the housing while the enclosure is in the first position and to facilitate coupling the enclosure to a support structure while the enclosure is in the second position, the at least one mounting opening configured to engage a biased retention spring.

2. The light fixture according to claim 1, wherein the housing includes an optic covering at least a portion of the light emitter.

3. The light fixture according to claim 2, wherein the enclosure is directly coupled to a side of the housing opposite the optic when the enclosure is in the first position.

4. The light fixture according to claim 1, wherein the at least one mounting opening is configured to engage a fastener.

5. The light fixture according to claim 1, wherein the housing includes at least one bracket directly coupling the housing to a support structure.

6. The light fixture according to claim 5, wherein the at least one bracket includes a pair of brackets extending from the housing in opposite directions.

7. The light fixture according to claim 1, wherein a conduit provides electrical communication between the driver and the light emitter in both positions.

8. The light fixture according to claim 7, wherein the conduit includes a first portion removably coupled to a second portion by an intermediate connector.

9. The light fixture according to claim 8, wherein the intermediate connector includes a first connector couple to the first portion of the conduit and a second connector coupled to the second portion of the conduit.

10. The light fixture according to claim 1, wherein the biased retention spring is positioned on one of the enclosure and the housing to releasably couple the enclosure to the housing, wherein depression of a biasing member permits the enclosure to be uncoupled from the housing.

11. The light fixture according to claim 1, further comprising a second mounting opening configured to engage a fastener.

12. A light fixture comprising:

a housing including a first side and a second side opposite the first side, the housing coupled to a first support structure and supporting a light emitter; and an enclosure supporting a driver in electrical communication with the light emitter, the enclosure selectively supported in each of a first position and a second position while maintaining electrical communication between the driver and the light emitter in each position, the enclosure being directly coupled to the housing in the first position, and the enclosure being directly coupled to a second support structure separately from and independently of the housing in the second position, the enclosure including at least one mounting opening directly coupling the enclosure to the housing in the first position and coupling the enclosure to the second support structure in the second position, the at least one mounting opening engaging a biased retention spring while the enclosure is in the first position.

13. The light fixture according to claim 12, wherein, in the first position, the enclosure directly coupled to a side of the housing opposite an optic.

14. The light fixture according to claim 12, wherein the at least one mounting opening is configured to engage a fastener.

15. The light fixture according to claim 12, wherein a conduit provides electrical communication between the driver and the light emitter in both positions, the conduit including a first portion removably coupled to a second portion by an intermediate connector.

16. The light fixture according to claim 15, wherein the intermediate connector includes a first connector couple to the first portion of the conduit and a second connector coupled to the second portion of the conduit.

17. The light fixture according to claim 12, further comprising a second mounting opening configured to engage a fastener.

18. A method for installing a light fixture, the method comprising the steps of:

determining whether the light fixture may be mounted in a desired location while an enclosure supporting a control driver is directly coupled to a housing;

if the enclosure cannot be directly coupled to the housing with the fixture in a desired location, mounting the housing in the desired location, and mounting the enclosure in a separate location while maintaining electrical communication between the control driver in the enclosure and a light emitter in the housing; and if the enclosure can be directly coupled to the housing with the fixture in a desired location, mounting the housing in the desired location with the enclosure directly coupled to the housing, the enclosure including a mounting opening configured to engage a biased retention spring on the housing.

19. The method according to claim 18, further comprising: disabling the electrical communication between the driver and the emitter; and re-enabling the electrical communication between the driver and the emitter.

20. The method according to claim 19, wherein disabling the electrical communication between the driver and the emitter includes disconnecting a first portion of a conduit from a second portion of the conduit via an intermediate connector; and, enabling the electrical communication between the driver and the emitter includes connecting the first portion of the conduit to the second portion of the conduit via the intermediate connector.

* * * * *